May 27, 1941.  G. MEYER  2,243,482
POWER AND SPEED TRANSMISSION, ESPECIALLY IN MOTOR VEHICLES
Filed Feb. 10, 1940
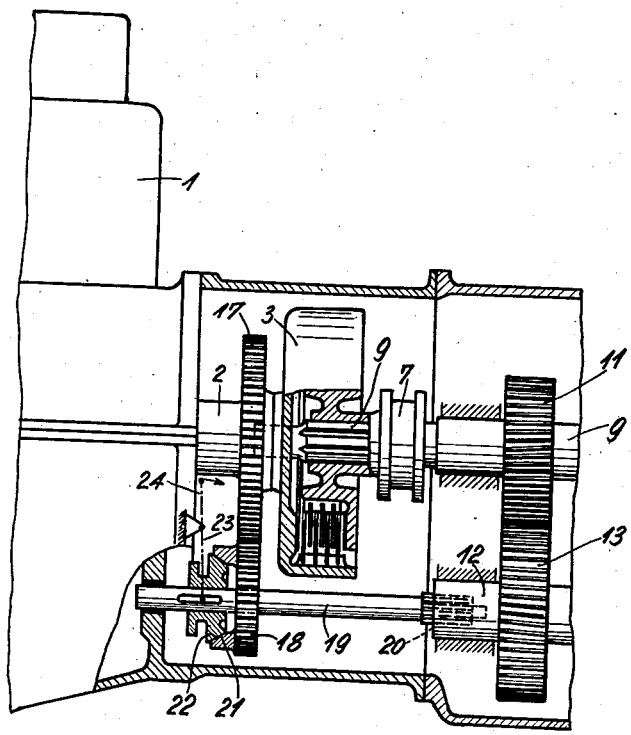
Inventor:
Gustav Meyer
by Edmund H. Parry Jr.
Attorney Patented May 27, 1941

2,243,482

UNITED STATES PATENT OFFICE 2,243,482

POWER AND SPEED TRANSMISSION, ESPECIALLY IN MOTOR VEHICLES

Gustav Meyer, Friedrichshafen, Bodensee, Germany, assignor to Maybach-Motorenbau G. m. b. H., Friedrichshafen, Bodensee, Germany Application February 10, 1940, Serial No. 318,345
In Germany February 10, 1939

10 Claims. (Cl. 74—339)

My invention relates to power and speed transmissions and has special reference to transmissions of this kind in motor vehicles which include a change speed gear. Change speed gears of the usual type being provided with a main shaft and an auxiliary shaft, both with gears for the different transmission ratios, afford an increase in speed in the rotation of the main shaft for the purpose of performing a speed change.

Object of my invention is to provide means for simplifying such speed changes and for reducing the time necessary for their performance. Another object is to make such additional means as small as possible so that no additional space is needed for providing them. There are still other objects as will easily be seen from the following specification.

According to my invention I provide means for increasing the speed of rotation of the main shaft in the change speed gear. For this purpose I make use of the fact that usually in change speed gears of the type mentioned above there is a pair of constantly meshing gears positioned most closely towards the incoming end of the gear casing. This gear pair normally consists of a gear of smaller diameter fixed to the main shaft and a gear of larger diameter fixed to the lay shaft, so that this constant drive causes the lay shaft to rotate at slower speed than the main shaft.

In accordance with my invention I make use of this gear pair in the reverse direction in the following manner. I provide an extension to the lay shaft and another gear thereon. This gear is adapted to mesh with a gear on the motor shaft. This entire additional transmission allows for the main shaft of the change speed gear to be rotated by the motor even when the main clutch between the motor and the change speed gear is interrupted. As the gear ratio of the first pair of gears in the change speed gear is so chosen that the lay shaft rotates slower than the main shaft this will now cause the main shaft to be increased in speed when driven by my new additional transmission. This effect may still be increased by choosing an adequate gear ratio for the additional gears on the motor shaft and on the extension of the lay shaft; which means that the first mentioned gear has to be larger in diameter than the latter mentioned. Whenever this additional transmission according to my invention is used for accelerating the main shaft of the change speed gear the direct connection to the motor over the main clutch is interrupted and no essential force is transmitted. Consequently, this additional transmission in its dimensions may be comparatively small, thin and light and yet serve to its purpose.

This transmission must, of course, be interruptable, for example by shifting one of the gears or by providing a clutch or the like for the gear on the motor shaft or in connection with the extension of the lay shaft. I prefer to have a kind of manually or automatically operated conical friction clutch by means of which the gear on the lay shaft extension may be connected to or disconnected from this shaft.

In certain cases it may be advisable to shape the outer portion of the main clutch being in driving connection with the motor into a gear adapted to mesh with the other gear on the lay shaft extension; thus saving an additional gear on the motor shaft.

Having given a general description of my invention I now want to point it out more in detail having reference to the drawing which represents an example embodying my invention.

The figure is a more diagrammatic side view—partly in section—on the rear end of a motor, the main clutch and the forward end of the change speed gear connected thereto.

Between the shaft 2 of the motor 1 and the main shaft 9 of the change speed gear (of which only one pair of gears is represented) the main clutch 3 is situated. It is of the laminated friction clutch type and adapted to be engaged or disengaged by means of shifting member 7, and it may cause driving connection between motor shaft 2 and main shaft 9 of the change speed gear. Fixed to this shaft 9 is gear 11 which meshes with gear 13 fixed to lay shaft 12.

A narrow gear 17 fixed to motor shaft 2 meshes with gear 18 loosely journaled on shaft 19, which is in driving connection with lay shaft 12 by means of splines 20. A conical friction clutch 21/22, adapted to be operated by means of levers indicated at 23 and 24 allows for engagement of gear 18 to shaft 19.

The operation of the mechanism is as follows:
Assuming the main clutch 3 was interrupted for the purpose of performing a speed change in the change speed gear which necessitates acceleration of main shaft 9, then by means of levers 24, 23 the friction clutch 22, 21 is operated to cause driving connection between gear 18 and shaft 19. Consequently this shaft, because of the gear ratio 17/18 is rotated at higher speed than the motor shaft 2, and because of the gear ratio 13/11, main shaft 9 of the change speed gear rotates again faster. Thus the necessary acceleration of this latter shaft is attained in shortest time and with the simplest possible means.

I do not want to be limited to the details described or shown in the drawing as many variations will occur to those skilled in the art without deviating from the scope of my invention.

What I claim is:

1. A power and speed transmission comprising: a motor shaft, a change speed gear for performing speed changes, including a main shaft and a lay shaft in constant driving connection with said main shaft, a disengageable main clutch between said motor shaft and said change speed gear, and means driven by the motor shaft and operative through the lay shaft to increase the speed of rotation of said main shaft when said main clutch is disengaged.

2. A power and speed transmission of the kind comprising: a motor shaft, a change speed gear for performing speed changes, including a main shaft and a lay shaft in constant driving connection with each other, a disengageable main clutch inserted between said motor shaft and said change speed gear, and means for increasing the speed of rotation of said main shaft, when said main clutch is disengaged, said means comprising: a gear fixed to said motor shaft, an extension to said lay shaft, a gear loosely journaled on said extension and meshing with said aforementioned gear, a friction clutch adapted to cause driving connection between said lay shaft extension and said last mentioned gear.

3. A power and speed transmission as claimed in claim 2, further including the feature that said gear fixed to said motor shaft is larger in diameter than said gear loosely journaled on said extension.

4. A power and speed transmission comprising: a motor shaft, a change speed gear for performing speed changes, including a main shaft and a lay shaft in constant driving connection with said main shaft, a disengageable main clutch between said motor shaft and said change speed gear, and means independent of the main shaft for driving the lay shaft from the motor shaft and being operative through the lay shaft to increase the speed of rotation of the main shaft when said main clutch is disengaged.

5. A power and speed transmission comprising: a motor shaft, a change speed gear for performing speed changes, including a main shaft, a lay shaft, and a constant driving connection between said main and lay shafts, a disengageable main clutch between said motor shaft and said main shaft, and auxiliary means driven from the motor shaft and operative through said constant driving connection between the main and lay shafts to speed up the main shaft when said main clutch is disengaged.

6. A power and speed transmission comprising: a motor shaft, a change speed gear for performing speed changes, including a main shaft, a lay shaft, and a constant driving connection between the main and lay shafts, and disengageable main clutch interconnecting the motor shaft and the main shaft, auxiliary driving means for driving the main shaft from the motor shaft through the lay shaft when the main clutch is disengaged, and means for making and breaking the driving connection through said auxiliary driving means.

7. A power and speed transmission comprising: a motor shaft, a change speed gear for performing speed changes, including a main shaft and a lay shaft in constant driving connection with said main shaft, a disengageable main clutch between said motor shaft and said change speed gear, a rotary direct driving connection from said motor shaft to said lay shaft for increasing the speed of rotation of the main shaft when the main clutch is disengaged, and means for interrupting said rotary direct driving connection.

8. A power and speed transmission comprising: a motor shaft, a change speed gear for performing speed changes, including a main shaft and a lay shaft in constant driving connection with said main shaft, a disengageable main clutch between said motor shaft and said change speed gear, and means for increasing the speed of rotation of the main shaft when the main clutch is disengaged comprising a gear wheel on the motor shaft, an extension of the lay shaft, a second gear wheel on said extension, in driving connection with said first gear wheel, one of said gear wheels being fixed to its shaft and the other of said gear wheels being loosely mounted on its shaft, and means for connecting and disconnecting the loosely mounted gear wheel to and from its shaft.

9. A power and speed transmission comprising: a motor shaft, a change speed gear for performing speed changes, including a main shaft and a lay shaft in constant driving connection with said main shaft, a disengageable main clutch between said motor shaft and said change speed gear, and means for increasing the speed of rotation of the main shaft when the main clutch is disengaged comprising an extension of the lay shaft, a gear wheel drive adapted to drive said extension together with said lay shaft from the motor shaft without making use of the main clutch, and means for throwing said additional driving connection between the motor shaft and the lay shaft into and out of engagement.

10. A power and speed transmission comprising: a motor shaft, a speed change gear for performing speed changes, including a main shaft and a lay shaft in constant driving connection with each other, a disengageable main clutch inserted between said motor shaft and said change speed gear, and auxiliary driving means for increasing the speed of rotation of said main shaft, when said main clutch is disengaged, said means comprising an extension of the lay shaft, a driving gear on the main shaft, a gear on the lay shaft extension driven by said driving gear, said gear on the motor shaft being of larger diameter than said gear on the lay shaft extension, and clutch means for making and breaking the driving connection through said auxiliary driving means.

GUSTAV MEYER.